March 9, 1926.  
C. F. RUBSAM  
1,576,226  
VEHICLE WHEEL  
Filed Feb. 18, 1925
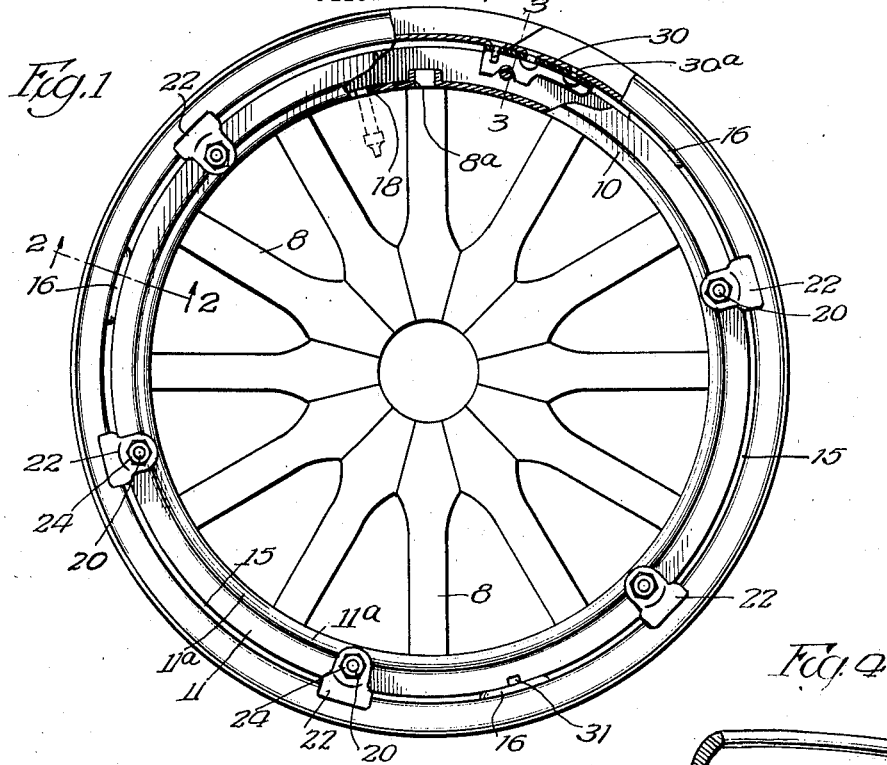
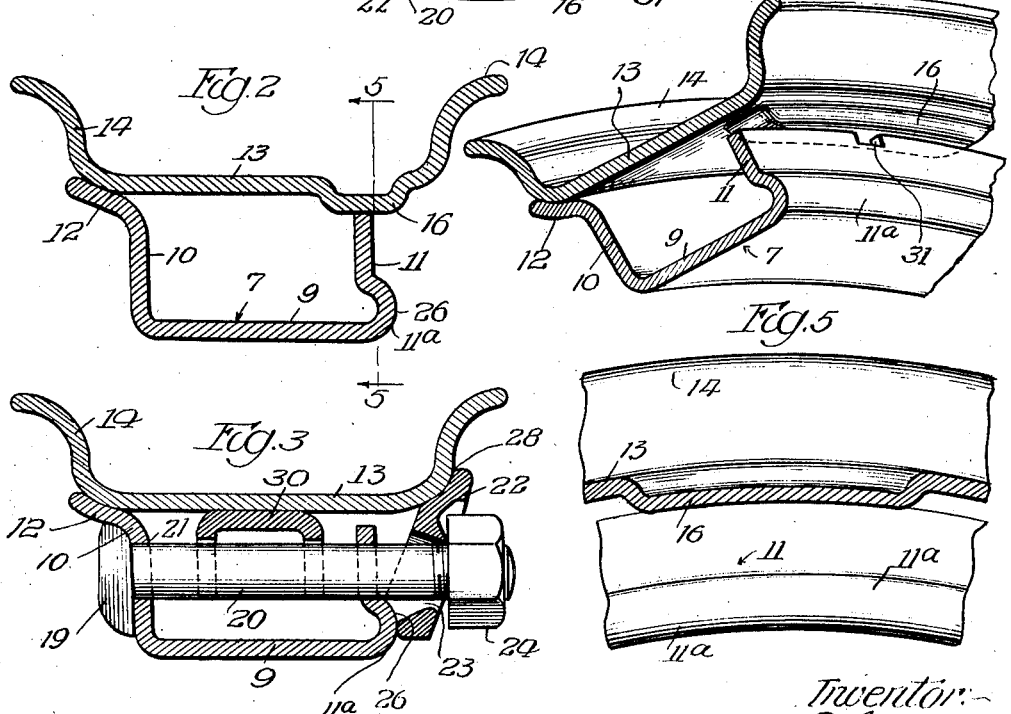
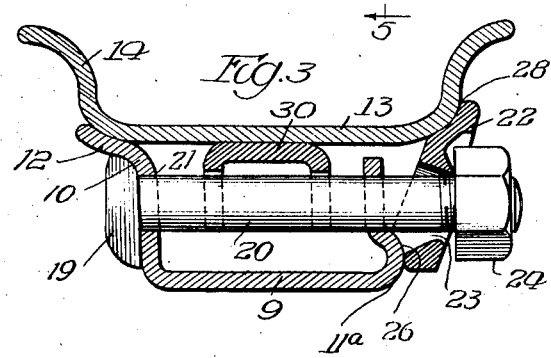
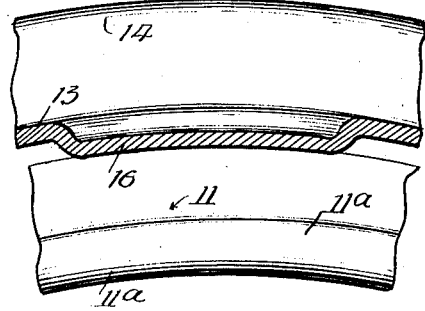

Patented Mar. 9, 1926.

1,576,226

UNITED STATES PATENT OFFICE.

CHARLES F. RUBSAM, OF JACKSON, MICHIGAN, ASSIGNOR TO RUBSAM CORPORATION, OF JACKSON, MICHIGAN, A CORPORATION OF DELAWARE.

VEHICLE WHEEL.

Application filed February 18, 1925. Serial No. 9,902.

*To all whom it may concern:*

Be it known that I, CHARLES F. RUBSAM, a citizen of the United States, and a resident of Jackson, in the county of Jackson and State of Michigan, have invented certain new and useful Improvements in Vehicle Wheels, of which the following is a full, clear, and exact description.

The invention relates to vehicle wheels and more particularly to that type which is provided with a metallic channel-shaped fixed rim and is adapted to carry a demountable tire-carrying rim. Its object is to provide an improved construction in which the demountable rim is provided with integral indentations whereby it will be truly positioned concentrically around the channel-shaped fixed rim at one side thereof, so that the other side thereof will fit truly and uniformly around the flared flange usually provided at the vehicle-side of the fixed rim.

The invention consists in the several novel features hereinafter set forth and more particularly defined by claims at the conclusion hereof.

In the drawings: Fig. 1 is a side elevation of a wheel embodying the invention, a portion of the fixed rim and the demountable rim being shown in section. Fig. 2 is a transverse section on line 2—2 of Fig. 1. Fig. 3 is a section on line 3—3 of Fig. 1. Fig. 4 is a perspective of a portion of the fixed rim and the demountable rim. Fig. 5 is a section on line 5—5 of Fig. 2.

The invention is exemplified in a wheel body composed of a channel-shaped fixed rim 7 and spokes 8 secured therein, as at 8ª, or in any other suitable manner. Rim 7 is made of a single sheet of metal in the form of an annular channel and has a transverse base 9 and integral side-flanges 10 and 11. Side-flange 10 terminates in a flared rim-receiving flange 12 which is disposed at the vehicle or inner side of the wheel to form an annular seat for one side of the inner periphery of a demountable rim of conventional cross-sectional shape. The latter comprises a base 13 and integral tire-retaining flanges 14 which may be shaped for any type of tire. The outer side-flange 11 of the fixed rim is annularly bulged, as at 11ª, and extends radially outward from the bulge. The outer periphery of flange 11 is concentric and is less in diameter than the adjacent inner periphery of the demountable rim to leave sufficient clearance for the easy placement and removal of the demountable rim. Three radially inward indentations 16 are integrally formed in the base 13 of the demountable rim and are arcuate and of limited length to leave circumferential clearances 15 between them and the periphery of flange 11 which substantially corresponds in diameter to the inner periphery of the indented portions 16. The radius of the inner periphery of the indented portions is substantially the same as the outer radius of the flange 11. These indented portions are adapted to contact with the periphery of the flange 11, when the demountable rim is applied to the fixed rim, and function to hold the demountable rim concentrically around the wheel-body while the lugs are being tightened. As a result, the demountable rim will take a true position on the flange 12, so that it will engage the same substantially throughout its entire periphery and this has been found necessary to effectively avoid squeaks and to avoid working of the rim which will tend to loosen it. The contiguous surfaces of the indented portions 16 and the outer periphery of flange 11 are substantially parallel to the wheel-axis or non-wedging so that they will not become jambed together by lateral movement of the demountable rim relatively to the fixed channel rim. The inner side of the demountable rim is supported by the flange 12 as hereinbefore described. These indented portions 16 are designed to contact with the periphery of flange 11, although it will be understood that the internal diameters of commercial rims vary slightly, and the clearances 15 between these supports are left to permit the easy appliance and removal of the demountable rim from the fixed rim by transverse tilting, while the usual tire valve on the demountable rim is in the usual hole 18 in the base of the fixed rim.

Any desired number of attaching or clamping devices may be provided at points circumferentially between the three indented portions 16. In the exemplification of the invention shown, two devices are used between adjacent indentations, which construction is adapted for heavy duty. In some instances, a single device between the indentations will suffice. These devices are adapted to support the demountable rim at its outer side, so that the demountable rim will be supported at one side by the flange 12 and at the other side by the clamping devices. Each of these clamping devices comprises a bolt having a head 19 engaging the outer side of flange 10; a shank 20 extending through aligned holes 21 in flanges 10 and 11; a lug or member 22, which has a hole 23 through which shank 20 passes; and a nut 24 threaded to the shank for securing the lug or member 22 in its operative position.

The demountable rim shown is of the transversely split type with its ends fixed together by a locking plate 30 which is riveted to one rim-end, as at 30ª, and removably secured to the other, as well understood in the art.

When the demountable rim is to be placed upon the wheel body, the latter is usually rotated to bring the bolt adjacent the hole 18 for the tire valve to the top; the demountable rim is then tilted transversely to bring the tire valve substantially into vertical alignment with hole 18 and the rim is then dropped until the valve has entered said hole and the driving plate is in its operative position. The lower portion of the demountable rim is then swung inwardly and substantially into alignment with the fixed rim; next, the lugs 22 are applied and all the nuts are tightened until all the lugs are firmly clamped into their operative positions. The demountable rim is removed by the reverse manipulation.

When the demountable rim, in being placed on the fixed rim of the wheel body, has been swung into approximate alignment therewith, the three arcuate indentations 16, integrally formed with the demountable rim, will center the demountable rim around the outer periphery of flange 11 under the necessary commercial variations. When the first of the lugs 22 is tightened, it will tend to force the demountable rim so the inner side thereof will ride upwardly on the flared flange 12 and out of concentric position, but this will be prevented by the indented portion 16 which is approximately diametrically opposite the outer periphery of flange 11. The same thing occurs when the remaining lugs are tightened. As a result, the demountable rim will be concentrically and accurately positioned on the flared flange 12 of the fixed rim, so that when the wheel is subjected to heavy stresses, there will be no relatively tight and loose portions between the flared flange and the demountable rim. When the latter occurs, squeaks result and cause working or grinding between the demountable rim and the flared flange.

To facilitate the removal of the demountable rim, a notch 31 is formed in the flange 11 of the fixed rim adjacent one of the indentations 16 on the demountable rim, to permit a screw-driver or other tool to be inserted between the rims and, if necessary, to be used as a pry to start to loosen the demountable rim, particularly at the notch which is disposed diametrically opposite the valve-hole.

The invention exemplifies a wheel construction in which the demountable rim is provided with means whereby it may be truly supported and aligned concentrically around the fixed wheel rim which has an outer side-flange with a concentric periphery.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a vehicle wheel, the combination of a fixed channel-shaped rim provided with an annular integral flange on the inner side thereof having a flared portion and an integral flange on the outer side, a demountable rim provided with indented portions of limited length and adapted to engage the periphery of the flange on the outer side of the fixed rim, and removable devices arranged circumferentially between the indented portions and adapted to support the demountable rim at the clearances between the indented portions, said clearances extending to and said indented portions terminating at points remote from said devices to permit the demountable rim to be placed on and removed from the fixed rim without retardation between the indented portions and said devices.

2. In a vehicle wheel, the combination of a fixed channel-shaped rim provided with a transverse base, an annular integral flange on the inner side thereof having a flared portion and an integral flange on the outer side having an annular bulge adjacent the base, a demountable rim of conventional shape provided in its base with indented portions of limited length adapted to engage the periphery of the flange on the outer side of the fixed rim, and removable lugs seated on the bulge and arranged circumferentially between the indented portions and adapted to support the demountable rim at the clearances between the indented portions, said clearances extending to and said indented portions terminating at points remote from said devices to permit the demountable rim to be placed on and removed from the fixed rim without retardation between the indented portions and said devices.

Signed at Jackson, Michigan, this 14th day of Feb., 1925.

CHARLES F. RUBSAM.